United States Patent
O'Sullivan et al.

(10) Patent No.: US 11,532,934 B2
(45) Date of Patent: Dec. 20, 2022

(54) PROTECTION DEVICE

(71) Applicant: Analog Devices International Unlimited Company, Limerick (IE)

(72) Inventors: Paul O'Sullivan, San Jose, CA (US); Maurice O'Brien, Limerick (IE); Donal G. O'Sullivan, Ardnacrusha (IE); Stefan Hacker, Munich (DE); Conal Watterson, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 459 days.

(21) Appl. No.: 16/204,930

(22) Filed: Nov. 29, 2018

(65) Prior Publication Data
US 2020/0176974 A1    Jun. 4, 2020

(51) Int. Cl.
*H02H 3/08* (2006.01)
*H02H 9/02* (2006.01)
*H02H 7/04* (2006.01)
*H02H 1/00* (2006.01)

(52) U.S. Cl.
CPC ............ *H02H 7/04* (2013.01); *H02H 1/0007* (2013.01)

(58) Field of Classification Search
CPC .......... H02H 7/04; H02H 1/0007; H02H 3/08; H02H 3/025; H02H 3/027
USPC ...................................................... 361/93.7
See application file for complete search history.

(56) References Cited

U.S. PATENT DOCUMENTS

| | | | |
|---|---|---|---|
| 5,596,466 A * | 1/1997 | Ochi | H02M 7/5387 361/103 |
| 5,801,442 A * | 9/1998 | Hamilton | H01L 23/473 257/712 |
| 6,307,758 B1 | 10/2001 | Geren | |
| 7,050,283 B2 | 5/2006 | Field et al. | |
| 8,145,458 B1 * | 3/2012 | Kukal | G06F 30/367 703/4 |
| 8,259,428 B2 | 9/2012 | Mollema et al. | |
| 9,077,170 B2 | 7/2015 | Gruber | |
| 9,172,239 B2 | 10/2015 | Mikolajczak | |
| 9,774,261 B2 | 9/2017 | Bui et al. | |
| 2005/0057277 A1 * | 3/2005 | Chen | H01F 19/08 326/82 |

(Continued)

FOREIGN PATENT DOCUMENTS

WO     2008043225     4/2008

OTHER PUBLICATIONS

"Digital Supervisor: D44TL1A0", Vicor Datasheet, (Sep. 2016), 25 pgs.

*Primary Examiner* — Jared Fureman
*Assistant Examiner* — Lucy M Thomas
(74) *Attorney, Agent, or Firm* — Schwegman Lundberg & Woessner, P.A.

(57) ABSTRACT

Digital isolator devices, and many other devices, have a maximum device junction temperature, which, if exceeded, may cause device failure and the integrity of the isolation is no longer guaranteed. The use of an electronic fuse, eFuse, arranged in series with the digital isolator, provides a protection scheme for the digital isolator in which current is limited by the eFuse when it is determined that the supply current of the digital isolator exceeds a predetermined threshold that would the cause junction temperature to increase above an absolute maximum rating. As such, the integrity of the digital isolator is preserved in the event of a system fault.

20 Claims, 5 Drawing Sheets

(56) References Cited

U.S. PATENT DOCUMENTS

| | | | |
|---|---|---|---|
| 2009/0023397 A1* | 1/2009 | Andersen | H04B 15/02 |
| | | | 455/82 |
| 2010/0302813 A1* | 12/2010 | Lu | H02M 3/33523 |
| | | | 363/21.01 |
| 2017/0005499 A1 | 1/2017 | Zhang et al. | |
| 2018/0069394 A1 | 3/2018 | Hagen et al. | |
| 2019/0020272 A1* | 1/2019 | Disney | H02M 3/156 |

* cited by examiner

PROTECTION DEVICE

FIELD OF THE DISCLOSURE

The present disclosure relates to the field of protection devices and more particularly, but not exclusively, it relates to protection devices for electrical components that are sensitive to temperature increases due to power dissipation, such as digital isolators.

BACKGROUND

Thermal management is of critical importance in electronics for protecting temperature sensitive electrical components from excess heat. Heat sinks, heat pipes, and thermoelectric coolers can be used for this purpose.

Many electrical components have a maximum device junction temperature, which is a predetermined temperature threshold above which component failure occurs. This rating is used to calculate maximum power dissipation for a given thermal resistance. Previously, efforts to measure device junction temperature of a component have been implemented directly by measuring temperature of the component and switching the component off when its temperature exceeds the maximum device junction temperature. However, it if often difficult to obtain an accurate reading of the component temperature in a quick enough time.

SUMMARY OF THE DISCLOSURE

Therefore, there is a need for improvements in protection devices. Digital isolator devices, and many other devices, have a maximum device junction temperature, which, if exceeded, may cause device failure and the integrity of the isolation is no longer guaranteed. The use of an electronic fuse, ("eFuse'), arranged in series with the digital isolator, provides a protection scheme for the digital isolator in which current is limited by the eFuse when it is determined that the supply current of the digital isolator exceeds a predetermined threshold that would cause the junction temperature to increase above an absolute maximum rating. As such, the integrity of the digital isolator is preserved in the event of a system fault.

According to a first aspect of the disclosure, there is provided a protection device for protecting a digital isolator having a maximum device junction temperature, the protection device comprising: an electronic fuse, eFuse, arranged in series with the digital isolator, wherein the eFuse is configured to interrupt a current on a power supply rail of the digital isolator based upon temperature dependency characteristics of the digital isolator.

The eFuse may be a discrete component or an integrated circuit component that is used to interrupt current and sometimes voltages during fault conditions.

Amongst its many advantages, the eFuse has a low and accurate current threshold, a fast response time and the eFuse is resettable. As such, the first aspect of the disclosure provides fast and reliable interruption of current by the eFuse. By "interrupting current", it is meant that current may be limited or removed.

A specific advantage of using an eFuse over a positive temperature coefficient (PTC) device or a current limiting resistor is that there no voltage drop associated with the eFuse. On the contrary, disadvantages of using a current limiting resistor include the voltage drop across the resistor which causes additional power dissipation in the system. If the voltage drop across the current limiting resistor causes the power supply rail of the digital isolator to drop below the minimum power supply required by the digital isolator in operation, then the current limiting resistor is not feasible for use with the digital isolator.

A specific advantage of using an eFuse over an external low-dropout regulator is that although the external low-dropout regulator will limit an overcurrent during a fault for a period of time, the current limit cannot typically be controlled very accurately and the internal voltage drop within the external low-dropout regulator can still be significantly larger than the voltage drop over an eFuse.

In the eFuse, an integrated electronic switch such as a field effect transistor (FET) or a bipolar junction transistor is provided to limit or remove current applied to the electrical component. A sense resistor may be used to measure the current in the system. The sense resistor may be internal or external to the eFuse, but internal may be preferable. An external current setting resistor is set at a value to determine an overcurrent level of the eFuse, although according to the first aspect of the disclosure, determination of the overcurrent level may be achieved by using a thermal derating curve, as will be further explained below. If used, the external current setting resistor may be used to set an accurate overcurrent level of the eFuse, for example, of ±15%.

Thus, the eFuse may comprise an internal sense resistor, an electronic switch for interrupting current flow and optionally an external current setting resistor for defining a predetermined overcurrent. The eFuse may also comprise an enable pin for enabling or disabling an output of the eFuse, and wherein the eFuse may further comprises a fault pin, the enable pin being tied directly to the fault pin for auto-retry of the efuse.

In examples of the first aspect of the disclosure, the digital isolator may comprise an internal low-dropout regulator for regulating supply rails for the internal circuitry. The internal low-dropout regulator typically has a minimum voltage requirement, which also determines the minimum voltage requirement of the digital isolator.

The temperature dependency characteristics of the digital isolator may be defined by a thermal derating curve. In particular, the thermal derating curve may provide a predetermined safe limiting power for a given ambient operating temperature of the digital isolator.

The maximum junction temperature of the digital isolator are usually specified on the data sheet of a particular digital isolator, and may be between 100-200° C.

In one example, the maximum junction temperature of the digital isolator may be 150° C. In this case, the predetermined safe limiting power of the digital isolator is 0W when the ambient temperature is 150° C., and this may be determined from a thermal derating curve. At ambient temperatures between 0° C. and 25° C., the predetermined safe limiting power may be 2.75 W. At ambient temperatures between 25° C. and 150° C., the predetermined safe limiting power may decrease linearly.

When the predetermined safe limiting power of the digital isolator, is exceeded, an internal timer in the eFuse may start and if the fault duration exceeds a blanking time duration, the output of the eFuse may be disconnected. The blanking time may be 100 µs, preferably 20 µs, and more preferably 10 µs. Preferably, the eFuse comprises an enable pin that is tied directly to a fault pin, thus allowing an auto-retry scheme. Otherwise, the eFuse latches off by default when the predetermined safe limiting power is exceeded.

According to a second aspect of the disclosure, there is provided a method of protecting a digital isolator having a maximum device junction temperature, the protection device comprising an electronic fuse, eFuse, arranged in series with the digital isolator, wherein the method comprises: interrupting current on a power supply rail of the digital isolator by the eFuse based upon temperature dependency characteristics of the digital isolator.

In some examples of the second aspect of the disclosure, the method may further comprise determining a predetermined safe limiting power for a given ambient operating temperature of the digital isolator using a thermal derating curve.

The method may further comprise interrupting current flow to the power supply rail of the digital isolator when power dissipation of the digital isolator exceeds the predetermined safe limiting power.

In some examples, the method may further comprise allowing a current to flow for a predetermined blanking time by the eFuse before disconnecting its output when the predetermined safe limiting power is exceeded.

According to a third aspect of the disclosure, there is provided use of an electronic fuse, eFuse, for protecting a digital isolator having a maximum device junction temperature, wherein the eFuse is configured to limit a current on a power supply rail of the digital isolator based upon temperature dependency characteristics of the digital isolator.

According to a fourth aspect of the disclosure, there is provided protection device for protecting an electrical component comprising an internal low-dropout regulator and the electrical component having a maximum device junction temperature, the protection device comprising: an electronic fuse, eFuse, arranged in series with the electrical component, wherein the eFuse is configured to limit a current on a power supply rail of the digital isolator based upon temperature dependency characteristics of the digital isolator.

All semiconductor devices will be sensitive to increases in power dissipation and associated temperature rise to some extent e.g. some semiconductor devices will have a thermal limit of typically 150° C. above which the device will fail.

The "sensitivity" is also related to the system and what the effect would be if a specific device fails. For example, device failure could result a safety issue (for example, people exposed to high voltage) or device failure could result in damage to other expensive components downstream. In other examples, a less sensitive component failure might cause a functional failure wherein the system no longer works correctly but there are no safety issues and no other components are damaged. As such, both electrical components that are sensitive to temperature rises themselves as well as electrical components that are not so sensitive to temperature rises but affect other system components would benefit from protection using the protection device of the fourth aspect.

In some examples of the fourth aspect of the disclosure, the temperature dependency characteristics of the electrical component may be defined by a thermal derating curve. In particular, the thermal derating curve may provide a predetermined safe limiting power for a given ambient operating temperature of the electrical component.

The eFuse may be configured to interrupt current flow to the power supply rail of the electrical component when power dissipation of the electrical component exceeds the predetermined safe limiting power. Further, the eFuse may be configured to allow current to flow for a predetermined blanking time before disconnecting its output when the predetermined safe limiting power is exceeded.

Advantages described in relation to the first, second, third and fourth aspects may also apply to the other aspects.

Particular advantages of using an eFuse for protecting a digital isolator according to the first aspect of the disclosure may also equally apply to using an eFuse for protecting an electrical component according to the fourth aspect of the disclosure.

BRIEF DESCRIPTION OF THE DRAWINGS

Examples of the present disclosure will now be described, by non-limiting example only, with reference to the accompanying drawings, in which.

DETAILED DESCRIPTION

It has been recognised that an improved protection device for temperature sensitive electrical components in an electronic circuit is desired. In particular, it has been recognised that protection devices that inherently limit power dissipation and associated increases in junction temperature offer advantages over ones that directly measure temperature of the electrical component.

Importantly, in aspects of the present disclosure, the protection device does not respond to measuring the temperature of the electrical component. Instead, the protection device comprises an eFuse that typically uses an integrated sense resistor for measuring current flow to the electrical component, and determines an overcurrent above which the eFuse is activated based upon a predetermined safe limiting power of the electrical component. The predetermined safe limiting power of the electrical component may be defined by a thermal derating curve for a given ambient temperature.

In some aspects of the present disclosure, the claimed protection device relates particularly to a digital isolator. Digital isolator devices are tested and certified up to a maximum device junction temperature. If the junction temperature of the device exceeds this maximum limit, then the integrity of the isolation is not guaranteed. A fault condition could lead to an increase in supply current and a corresponding increase in junction temperature due to self-heating. This then has the potential to cause a failure in the isolation of the device and is of particular concern in an electrical safety or functional safety application.

An example of a digital isolator of the type that is protectable by the protection device as claimed by claim 1 is the "iCoupler" device of US 2005/0057277 A1, which is a transformer-based approach to isolation that combines the advantages of optocoupler, transformer, and semiconductor technologies.

By integrating micro-transformers onto semiconductor dice, isolation is provided by the iCoupler device without the detrimental characteristics of the electro-optical conversions present in traditional optocouplers. The isolation rating of the iCoupler device is guaranteed up to the maximum junction temperature of the device (which may typically be 150° C.). If a fault occurs that causes the junction temperature of the iCoupler device to increase above the maximum junction temperature, isolation is no longer guaranteed.

Figure 1:
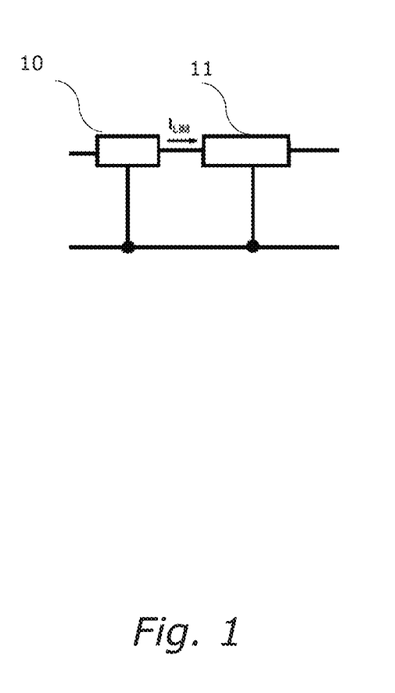
FIG. 1 is a circuit diagram showing a protection device for a digital isolator in accordance with a first example of the present disclosure.

FIG. 1 is a circuit diagram showing a protection device 10 for a power supply rail of a digital isolator 11 in accordance with a first example of the disclosure. The protection device 10 includes an electronic fuse, eFuse, arranged in series with the digital isolator 11, and the eFuse is configured to limit a current on a power supply rail of the digital isolator 11 based upon temperature dependency characteristics of the digital isolator 11.

The digital isolator 11 has a maximum device junction temperature, for example, between 100° C. and 200° C. The digital isolator may include an internal low-dropout regulator that has a minimum voltage requirement that at least partially determines the minimum voltage requirement of the digital isolator 11. Due this the minimum input voltage requirement, a current limiting resistor could not be used in place of the protection device 10 because the voltage drop across the resistor would drop the supply voltage to the internal low-dropout regulator of the digital isolator below the internal low-dropout regulator minimum voltage.

However, the protection device 10 comprising an eFuse has a low voltage drop in normal operation and it can therefore meet the input voltage requirement of the internal low-dropout regulator of the digital isolator.

The eFuse within the protection device 10 is configured to set an accurate current limit on the power supply rail of the digital isolator 11. The eFuse comprises an internal sense resistor for sensing current and an electronic switch for interrupting current flow. The eFuse also comprises an enable pin for enabling or disabling an output of the eFuse, and wherein the eFuse may further comprises a fault pin, the enable pin being tied directly to the fault pin for auto-retry functionality.

The way that the protection device 10 utilises information derived from the maximum junction temperature of the digital isolator in order to interrupt current to the power supply rail of the digital isolator 11 in order to avoid damage to the digital isolator 11 during a fault condition is described below in relation to FIG. 2.

In other examples of the present disclosure, the component could be any temperature sensitive component instead of the digital isolator, for example any semiconductor device with a maximum junction temperature rating.

Figure 2:
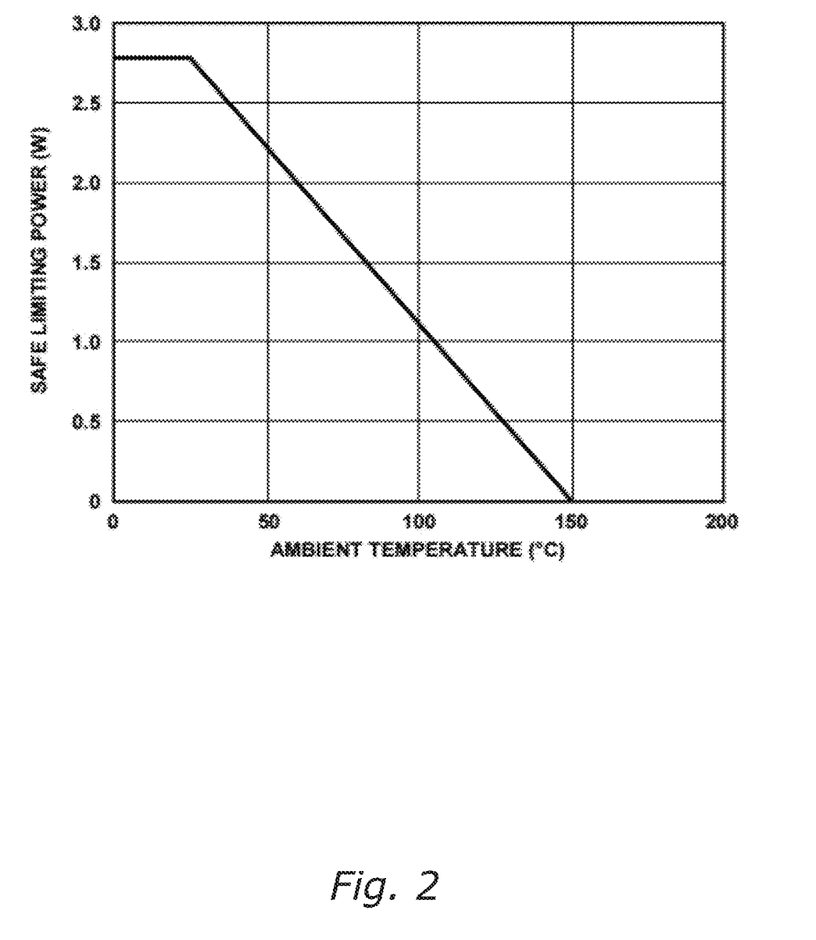
FIG. 2 is a thermal derating curve of a digital isolator that is protectable by a protection device in accordance with a second example of the present disclosure.

FIG. 2 shows a thermal derating curve having ambient temperature as the x-axis and maximum safe limiting power, or allowable power dissipation, as the y-axis. This thermal derating curve is used to ensure the maximum junction temperature of the digital isolator is not exceeded. For example, at 150° C. ambient junction temperature, the device cannot dissipate any power as any self-heating would cause the part to exceed the maximum junction temperature of 150° C.

According to the thermal derating curve of FIG. 2, the maximum junction temperature of the digital isolator is 150° C. At ambient temperatures between 0° C. and 25° C., the predetermined safe limiting power may be 2.75 W. At ambient temperatures between 25° C. and 150° C., the predetermined safe limiting power may decrease linearly.

Depending upon the predetermined safe limiting power that is derived from the thermal derating curve, the eFuse may set a predetermined overcurrent level at which it is activated. When current flowing through the eFuse exceeds the predetermined overcurrent level, the electronic switch in the eFuse is activated in order to interrupt, i.e. limit or remove, current flow through the digital isolator.

In some examples, an internal timer in the eFuse may start when the predetermined overcurrent level actives the eFuse and if the fault duration exceeds a blanking time duration, the output of the eFuse is then disconnected. The blanking time may be 100 μs, preferably 20 μs, and more preferably 10 μs. The blanking time is set sufficiently low to avoid excessive self-heating of the device at elevated supply current. After the output of the eFuse has been disconnected, this guarantees that the digital isolator cannot overheat and exceed its maximum junction temperature.

Further, when the eFuse comprises an enable pin that is tied directly to a fault pin, this allows an auto-retry scheme. Otherwise, the eFuse latches off by default when the predetermined safe limiting power is exceeded.

Figure 3:
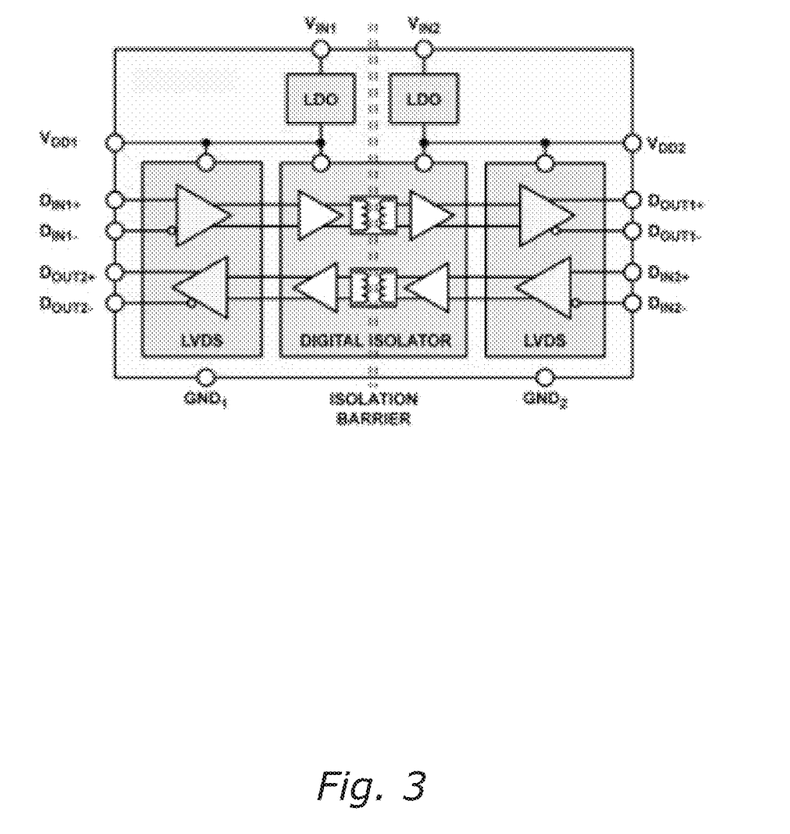
FIG. 3 is a schematic diagram of a digital isolator that is protectable by a protection device in accordance with the second example of the present disclosure.

In FIG. 3, a schematic diagram of a digital isolator that is protectable by a protection device in accordance with the second example of the present disclosure is shown. The digital isolator is a dual channel isolator and it comprises two internal low-dropout regulators and two low-voltage differential signalling units.

Figure 4:
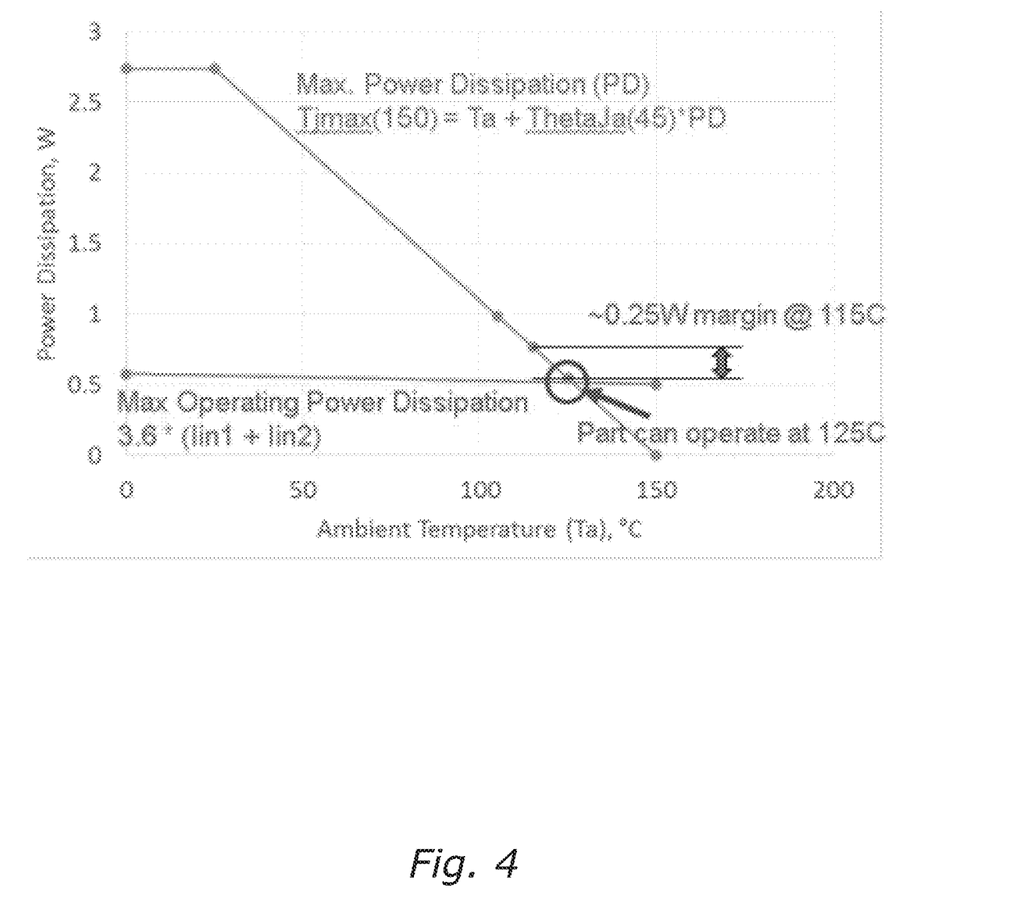
FIG. 4 shows how the thermal derating curve of FIG. 2 is used in design of a protection device in accordance with the second example of the present disclosure.

In FIG. 4, the thermal derating curve of FIG. 2 is shown in conjunction with the maximum power dissipation of the digital isolator in normal operating conditions. In designing a protection device in accordance with the second example of the present disclosure, the designer can see from the graph of FIG. 4 that the digital isolator to be protected operates at 125° C. as an upper limit. From the thermal derating curve, the constraints on power dissipation of the digital isolator is given for maintaining isolation. It can be seen that there is a 250 mW margin between the upper limit and normal operation at an ambient temperature of 115° C. In this case, the input current of the digital isolator (Iin1+Iin2) needs to be limited to 0.25 W/3.6V=70 mA above the maximum supply current datasheet specification.

Figure 5:
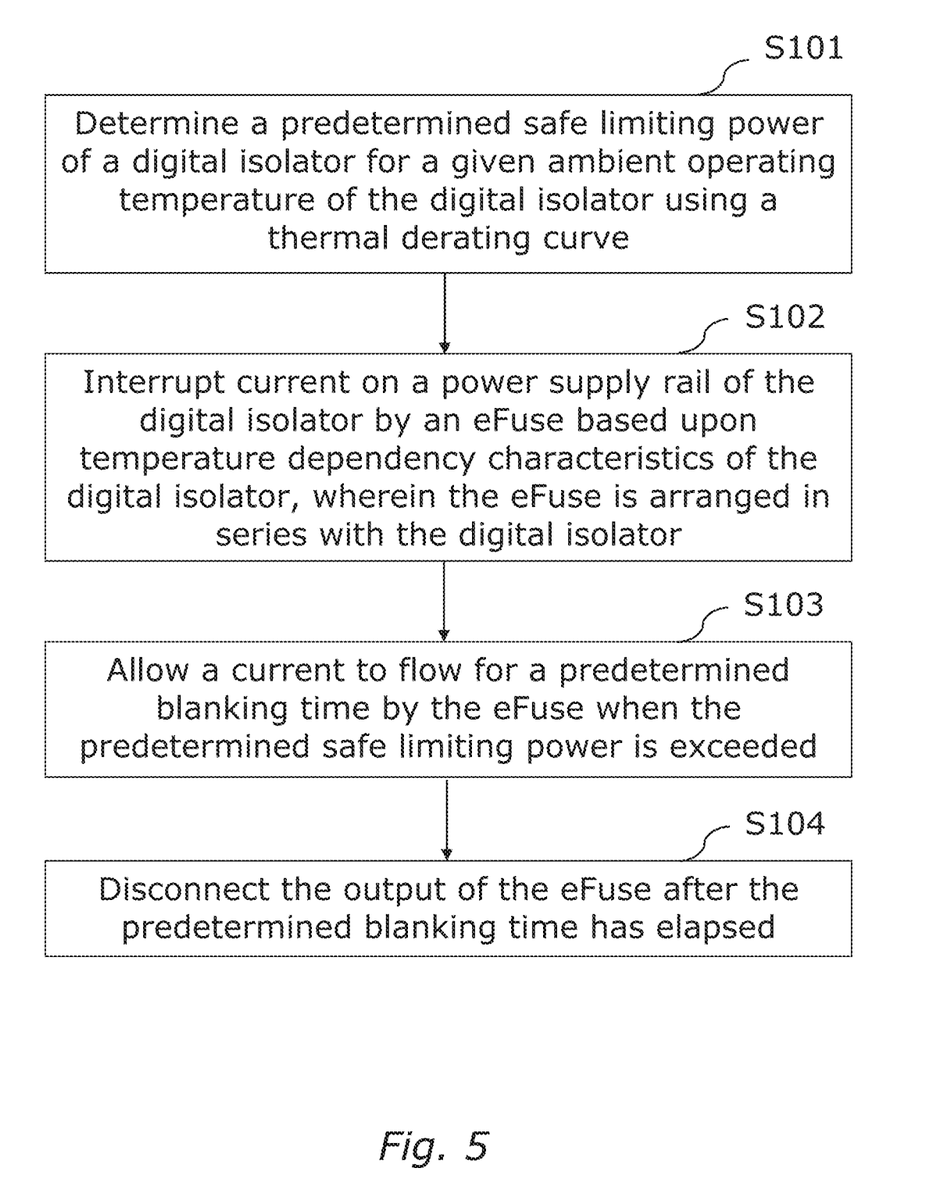
FIG. 5 is a flow chart that illustrates a method in accordance with a third example of the present disclosure.

FIG. 5 is a flow chart that illustrates a method in accordance with a third example of the present disclosure.

At step S101, a predetermined safe limiting power of a digital isolator is determined for a given ambient operating temperature of the digital isolator using a thermal derating curve. The thermal derating curve may be specific for each digital isolator. Typically, it comprises a decreasing linear relationship between a predetermined safe limiting power and ambient temperature.

At step S102, current on a power supply rail of the digital isolator is interrupted by an eFuse based upon temperature dependency characteristics of the digital isolator, wherein the eFuse is arranged in series with the digital isolator. The temperature dependency characteristics of the digital isolator determine the current threshold for the eFuse.

At step S103, a current is allowed to flow for a predetermined blanking time by the eFuse when the predetermined safe limiting power is exceeded.

At step S104, the output of the eFuse is disconnect after the predetermined blanking time has elapsed, thus totally removing current flow to the digital isolator and protecting it from overheating.

The above description relates to particularly preferred aspects of the disclosure, but it will be appreciated that other implementations are possible. Variations and modifications will be apparent to the skilled person, such as equivalent and other features which are already known and which may be used instead of, or in addition to, features described herein. Features that are described in the context of separate aspects or examples may be provided in combination in a single aspect or example. Conversely, features which are described in the context of a single aspect or example may also be provided separately or in any suitable sub-combination.

The invention claimed is:

1. A protection device for protecting a digital isolator having a maximum device junction temperature, the protection device comprising:
an electronic fuse, ("eFuse"), arranged in series with the digital isolator, wherein the digital isolator includes an integrated circuit (IC) transformer-based electrical conduction barrier between an input of the digital isolator and an output of the digital isolator, wherein the eFuse is configured to remove current flow through the digital isolator to protect the digital isolator from overheating, the eFuse removing the current flow based upon a temperature dependency characteristic of the digital isolator, wherein the eFuse removes the current flow based upon a sensed current through the eFuse exceeding an overcurrent threshold level, the overcurrent threshold level corresponding to the temperature dependency characteristic and is specified to maintain the digital isolator below the maximum device junction temperature of the digital isolator.

2. A protection device according to claim 1, wherein the digital isolator comprises an internal low-dropout regulator, the maximum device junction temperature of the digital isolator representing a junction temperature above which the digital isolator fails to provide isolation.

3. A protection device according to claim 1, wherein the overcurrent threshold level is specified by a thermal derating curve of the digital isolator including the (IC) transformer-based electrical conduction barrier between the input of the digital isolator and the output of the digital isolator.

4. A protection device according to claim 3, wherein the thermal derating curve provides a predetermined safe limiting power for a given ambient operating temperature of the digital isolator.

5. A protection device according to claim 4, wherein the eFuse is configured with the overcurrent threshold level specified to interrupt current flow to a power supply rail of the digital isolator when power dissipation of the digital isolator exceeds the predetermined safe limiting power.

6. A protection device according to claim 5, wherein the eFuse is configured to allow current to flow for a predetermined blanking time before disconnecting its output when the predetermined safe limiting power is exceeded.

7. A protection device according to claim 6, wherein an internal timer corresponding to the predetermined blanking time of the eFuse starts when the sensed current through the eFuse exceeds the overcurrent threshold level.

8. A protection device according to claim 1, wherein the eFuse comprises an integrated electronic switch for interrupting current flow.

9. A protection device according to claim 1, wherein the eFuse comprises an enable pin for enabling or disabling an output of the eFuse, and wherein the eFuse further comprises a fault pin, and preferably wherein the enable pin is tied directly to the fault pin for auto-retry operation.

10. A protection device according to claim 1, wherein the eFuse is configured to interrupt a current on a power supply rail of the digital isolator based upon a sensed current through the eFuse exceeding an overcurrent threshold level that is specified to maintain the digital isolator below the maximum device junction temperature of the digital isolator, wherein the maximum junction temperature of the digital isolator is between 100-200° C.

11. A method of protecting a digital isolator having a maximum device junction temperature, the protection device comprising an electronic fuse, ("eFuse"), arranged in series with the digital isolator, wherein the method comprises:
sensing a current through the eFuse;
comparing the sensed current through the eFuse to an overcurrent threshold level that that is specified to maintain the digital isolator below the maximum device junction temperature of the digital isolator, wherein the digital isolator includes an integrated circuit (IC) transformer-based electrical conduction barrier between an input of the digital isolator and an output of the digital isolator; and
remove current flow through the digital isolator by the eFuse based upon a temperature dependency characteristic of the digital isolator to protect the digital isolator from overheating in response to the sensed current exceeding the overcurrent threshold level, the overcurrent threshold level corresponding to the temperature dependency characteristic.

12. A method according to claim 11, wherein the method further comprises:
determining the overcurrent threshold level using a predetermined safe limiting power for a given ambient operating temperature of the digital isolator including the IC transformer using a thermal derating curve.

13. A method according to claim 12, wherein the method further comprises:
interrupting current flow to a power supply rail of the digital isolator when the sensed current exceeds the sensed current threshold specified to indicate that power dissipation of the digital isolator exceeds a predetermined safe limiting power.

14. A method according to claim 13, wherein the method further comprises:
allowing a current to flow for a predetermined blanking time by the eFuse before disconnecting its output when the predetermined safe limiting power is exceeded.

15. Use of an electronic fuse, ("eFuse"), for protecting a digital isolator having a maximum device junction temperature, wherein the eFuse is configured to remove current flow through the digital isolator based upon a temperature dependency characteristic of the IC transformer and based upon a sensed current through the eFuse exceeding an overcurrent threshold level of the digital isolator, the overcurrent threshold level corresponding to the temperature dependency characteristic, wherein the digital isolator includes an integrated circuit (IC) transformer-based electrical conduction barrier between an input of the digital isolator and an output of the digital isolator.

16. A protection device for protecting an electrical component comprising an internal low-dropout regulator and the electrical component including an IC transformer having a maximum device junction temperature, the protection device comprising:
an electronic fuse, ("eFuse"), arranged in series with the electrical component,
wherein the eFuse is configured to remove current flow through the electrical component including the IC transformer based upon a temperature dependency characteristic of the IC transformer, when a sensed current through the eFuse exceeds an overcurrent threshold level of the IC transformer, the overcurrent threshold level corresponding to the temperature dependency characteristic.

17. A protection device according to claim 16, wherein the overcurrent threshold level is defined by a thermal derating curve.

18. A protection device according to claim 17, wherein the thermal derating curve provides a predetermined safe limiting power for a given ambient operating temperature of the electrical component including the IC transformer.

19. A protection device according to claim 18, wherein the eFuse is configured to interrupt current flow to a power supply rail of the electrical component including the IC transformer when power dissipation of the electrical component including the IC transformer exceeds the predetermined safe limiting power.

20. A protection device according to claim 19, wherein the eFuse is configured to allow current to flow for a predetermined blanking time before disconnecting its output when the predetermined safe limiting power is exceeded.

* * * * *

UNITED STATES PATENT AND TRADEMARK OFFICE
CERTIFICATE OF CORRECTION

PATENT NO. : 11,532,934 B2
APPLICATION NO. : 16/204930
DATED : December 20, 2022
INVENTOR(S) : O'Sullivan et al.

It is certified that error appears in the above-identified patent and that said Letters Patent is hereby corrected as shown below:

In the Claims

In Column 8, Line 6, in Claim 11, delete "that that" and insert --that-- therefor Signed and Sealed this
Eleventh Day of June, 2024

Katherine Kelly Vidal
*Director of the United States Patent and Trademark Office*